United States Patent
Naito et al.

(10) Patent No.: US 11,707,648 B2
(45) Date of Patent: Jul. 25, 2023

(54) GOLF BALL

(71) Applicant: Sumitomo Rubber Industries, Ltd., Kobe (JP)

(72) Inventors: Yasuo Naito, Kobe (JP); Masayuki Onishi, Kobe (JP); Kazuyoshi Shiga, Kobe (JP); Takahiro Shigemitsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/497,213

(22) Filed: Oct. 8, 2021

(65) Prior Publication Data

US 2022/0111260 A1    Apr. 14, 2022

(30) Foreign Application Priority Data

Oct. 9, 2020  (JP) .................. 2020-171228

(51) Int. Cl.
*A63B 37/06* (2006.01)
*A63B 37/00* (2006.01)

(52) U.S. Cl.
CPC .. *A63B 37/00221* (2020.08); *A63B 37/00222* (2020.08)

(58) Field of Classification Search
CPC ................................ A63B 37/0022
USPC ....................................... 473/378
See application file for complete search history.

(56) References Cited

U.S. PATENT DOCUMENTS

| | | | |
|---|---|---|---|
| 2011/0053708 A1 | 3/2011 | Isoagawa et al. | |
| 2011/0244989 A1 | 10/2011 | Tarao et al. | |
| 2017/0340922 A1* | 11/2017 | Inoue | C08G 18/792 |
| 2020/0139199 A1 | 5/2020 | Horiuchi et al. | |
| 2020/0197754 A1 | 6/2020 | Naito | |

FOREIGN PATENT DOCUMENTS

| | | |
|---|---|---|
| JP | 2011-67595 A | 4/2011 |
| JP | 2011-217820 A | 11/2011 |
| JP | 2014-14383 A | 1/2014 |
| JP | 2017-209298 A | 11/2017 |
| JP | 2020-69309 A | 5/2020 |
| JP | 2020-99669 A | 7/2020 |

* cited by examiner

*Primary Examiner* — Raeann Gorden
(74) *Attorney, Agent, or Firm* — Birch, Stewart, Kolasch & Birch, LLP

(57) ABSTRACT

An object of the present invention is to provide a novel golf ball having excellent spin performance on approach shots. The present invention provides a golf ball comprising a golf ball body, and a paint film formed on a surface of the golf ball body and composed of at least one layer, wherein a base resin constituting an outermost layer of the paint film includes a polyurethane, and the polyurethane has a loss elastic modulus (E″) of $0.2 \times 10^8$ Pa or more at $-50°$ C. and a loss tangent (tan δ) having a peak temperature of $0°$ C. or less, obtained by measuring dynamic viscoelasticity of the polyurethane under specific conditions.

18 Claims, 1 Drawing Sheet

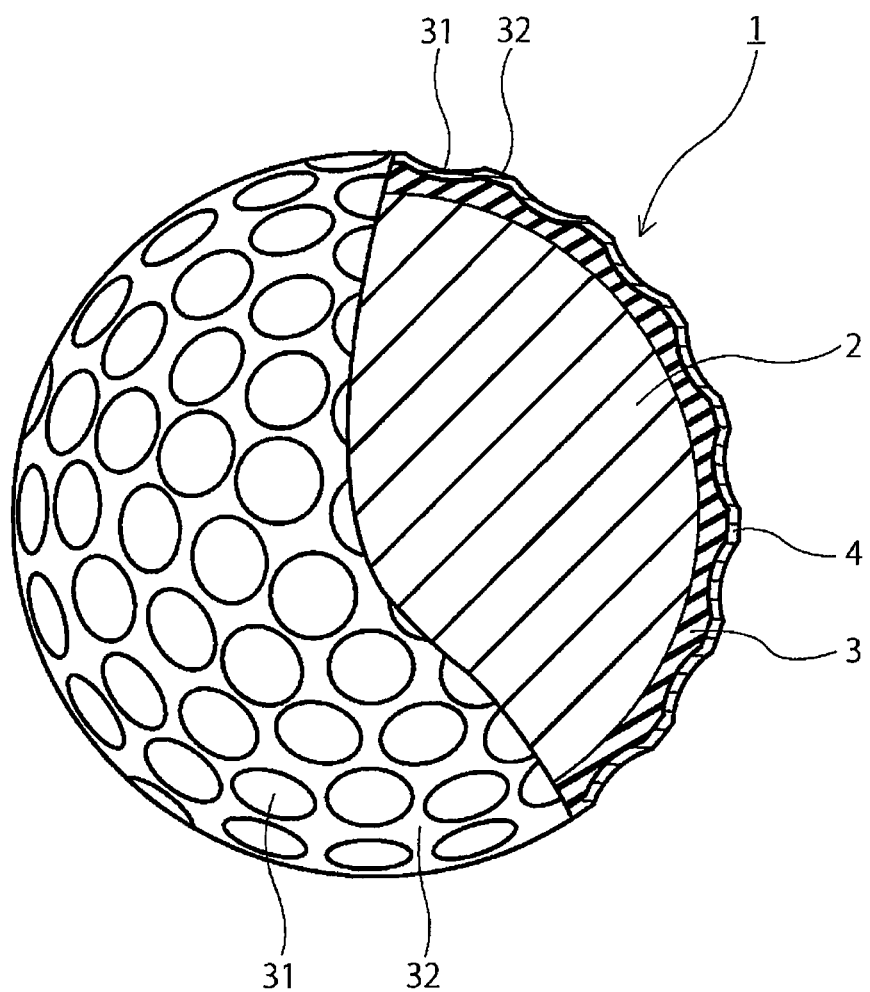

GOLF BALL

FIELD OF THE INVENTION

The present invention relates to a golf ball having a paint film.

DESCRIPTION OF THE RELATED ART

A paint film is formed on a surface of a golf ball body. It has been proposed to improve properties of a golf ball by improving the paint film thereof.

JP 2011-67595 A discloses a golf ball comprising a core, a cover situated on the external side of the core, and a paint layer situated on the external side of the cover, wherein the cover has a Shore D hardness of no greater than 61, and the paint layer has a Martens hardness of no greater than 2.0 mgf/μm².

JP 2011-217820 A discloses a golf ball comprising a golf ball body, and a paint film formed on a surface of the golf ball body, wherein the paint film has a Martens hardness of 2.0 mgf/μm² or less, and a ratio of 50% modulus to 10% modulus (50% modulus/10% modulus) of 1.6 or more.

JP 2014-14383 A discloses a golf ball comprising a golf ball body, and a paint film formed on a surface of the golf ball body, wherein the paint film has a storage elastic modulus (E') of $1.00 \times 10^7$ dyn/cm² or more and $1.00 \times 10^8$ dyn/cm² or less at a temperature range from 120° C. to 150° C., and a loss tangent (tan δ) of 0.050 or more at a temperature of 10° C., measured with a dynamic viscoelasticity measuring apparatus under specific measuring conditions.

JP 2017-209298 A discloses a golf ball comprising a golf ball body, and a paint film covering the golf ball body, wherein a loss tangent tan δ has a peak temperature of 50° C. or less, and a peak height of less than 0.8, obtained by measuring dynamic viscoelasticity of the paint film.

JP 2020-69309 A discloses a golf ball comprising a golf ball body, and a paint film formed on a surface of the golf ball body and composed of at least one layer, wherein an outermost paint film layer located at the outermost layer of the golf ball contains, as a base resin, a polyurethane obtained by a reaction between (A) a polyisocyanate composition and (B) a polyol composition, (B) the polyol composition contains a urethane polyol as a polyol component, and a loss tangent (tan δ) of the outermost layer of the paint film measured with a dynamic viscoelasticity measuring apparatus under specific conditions has a peak temperature in a range from −40° C. to 40° C.

JP 2020-99669 A discloses a golf ball comprising a golf ball body, and a paint film formed on a surface of the golf ball body and composed of at least one layer, wherein a base resin constituting an outermost layer of the paint film is a polyurethane obtained by a reaction between (A) a polyol composition and (B) a polyisocyanate composition, and a loss elastic modulus (E") at a temperature of −50° C. is $1.00 \times 10^8$ Pa or more obtained by measuring dynamic viscoelasticity of the polyurethane under specific conditions.

SUMMARY OF THE INVENTION

An object of the present invention is to provide a novel golf ball having excellent spin performance on approach shots.

The present invention provides a golf ball comprising a golf ball body, and a paint film formed on a surface of the golf ball body and composed of at least one layer, wherein a base resin constituting an outermost layer of the paint film includes a polyurethane, and the polyurethane has a loss elastic modulus (E") of $0.2 \times 10^8$ Pa or more at a temperature of −50° C. and a loss tangent (tan δ) having a peak temperature of 0° C. or less, obtained by measuring dynamic viscoelasticity of the polyurethane under following conditions.

<Measuring Conditions>
measuring mode: sine wave tensile mode
measuring temperature range: −120° C. to 100° C.
Temperature increasing rate: 3° C./min
oscillation frequency: 10 Hz
measuring strain: 0.05%

When the hitting speed on approach shots is 16 m/s, and the unevenness of the face land portion of the wedge is several micrometers, the paint film of the golf ball is subjected to the vibration of $10^7$ Hz on approach shots. According to the time-temperature conversion rule, the dynamic viscoelasticity of the paint film measured at normal temperature and the vibration of $10^7$ Hz is converted to the dynamic viscoelasticity measured at the temperature of −50° C. and a frequency of 10 Hz. The inventors of the present invention have found that controlling the loss elastic modulus and the peak temperature of loss tangent (tan δ) of the polyurethane constituting the outermost layer of the paint film of the golf ball measured at the temperature of −50° C. and the frequency of 10 Hz improves the spin performance on approach shots, and thus has accomplished the present invention.

The paint film used in the present invention is soft. According to the present invention, the golf ball having excellent spin performance on approach shots is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a golf ball body, and a paint film formed on a surface of the golf ball body and composed of at least one layer, wherein a base resin constituting an outermost layer of the paint film includes a polyurethane, and the polyurethane has a loss elastic modulus (E") of $0.2 \times 10^6$ Pa or more at a temperature of −50° C. and a loss tangent (tan δ) having a peak temperature of 0° C. or less, obtained by measuring dynamic viscoelasticity of the polyurethane under following conditions.

<Measuring Conditions>
measuring mode: sine wave tensile mode
measuring temperature range: −120° C. to 100° C.
Temperature increasing rate: 3° C./min
oscillation frequency: 10 Hz
measuring strain: 0.05%

The polyurethane constituting the outermost layer of the paint film of the golf ball according to the present invention has a loss elastic modulus (E") of $0.2 \times 10^6$ Pa or more at a temperature of −50° C. obtained by measuring dynamic viscoelasticity of the polyurethane under following conditions.

<Measuring Conditions>
measuring mode: sine wave tensile mode
measuring temperature range: −120° C. to 100° C.

Temperature increasing rate: 3° C./min
oscillation frequency: 10 Hz
measuring strain: 0.05%

From the viewpoint of enhancing the spin performance on approach shots, the loss elastic modulus (E") is more preferably $0.3 \times 10^8$ Pa or more, and even more preferably $0.5 \times 10^8$ Pa or more, and is preferably $5.0 \times 10^9$ Pa or less, more preferably $9.0 \times 10^8$ Pa or less, and even more preferably $8.0 \times 10^8$ Pa or less.

The polyurethane constituting the outermost layer of the paint film of the golf ball according to the present invention has a storage elastic modulus (E') preferably in a range from $0.05 \times 10^8$ Pa to $3.0 \times 10^8$ Pa at a temperature of 0° C. obtained by measuring dynamic viscoelasticity of the polyurethane under the above conditions. The contact time between the golf ball and the wedge face on approach shots is about five hundreds micro seconds. This means that the paint film digs into the score lines of the wedge about 2000 times per second (=2000 Hz). According to the time-temperature conversion rule, the dynamic viscoelasticity of the paint film measured at normal temperature and the vibration of 2000 Hz corresponds to the dynamic viscoelasticity measured at a temperature of 0° C. and a frequency of 10 Hz. Thus, the inventors of the present invention have focused on the storage elastic modulus (E') measured at a temperature of 0° C. and a frequency of 10 Hz. If the polyurethane having the storage elastic modulus (E') falling within the above range is used for the paint film, the paint film tends to more dig into the score lines of the wedge. As a result, the spin performance is enhanced.

From the viewpoint of enhancing the spin performance on approach shots, the storage elastic modulus (E') is more preferably $0.1 \times 10^8$ Pa or more, and even more preferably $0.3 \times 10^8$ Pa or more, and is more preferably $9.0 \times 10^8$ Pa or less, and even more preferably $7.0 \times 10^8$ Pa or less.

The polyurethane constituting the outermost layer of the paint film of the golf ball according to the present invention has a loss tangent (tan δ) having a peak temperature obtained by measuring dynamic viscoelasticity of the polyurethane under the above conditions. The peak temperature of the loss tangent (tan δ) is preferably 0° C. or less, more preferably less than –40° C., and even more preferably –45° C. or less, and is preferably –90° C. or more, more preferably –60° C. or more, and even more preferably –55° C. or more. If the peak temperature of the loss tangent (tan δ) falls within the above range, a ratio (loss elastic modulus at –50° C./storage elastic modulus) increases, and the spin performance on approach shots is enhanced.

The 10% modulus of the polyurethane constituting the outermost layer of the paint film of the golf ball according to the present invention is preferably 1 kgf/cm² (0.10 MPa) or more, more preferably 3 kgf/cm² (0.29 MPa) or more, and even more preferably 5 kgf/cm² (0.49 MPa) or more, and is preferably 50 kgf/cm² (4.9 MPa) or less, more preferably 40 kgf/cm² (3.9 MPa) or less, and even more preferably 30 kgf/cm² (2.9 MPa) or less. If the 10% modulus of the polyurethane of the outermost layer of the paint film is 1 kgf/cm² or more, the paint film has low stickiness, and thus is hardly stained, and if the 10% modulus of the polyurethane of the outermost layer of the paint film is 50 kgf/cm² or less, the paint film has a greater dynamic frictional coefficient, the spin rate on approach shots under a condition that there is grass between the golf ball and the club face increases.

The base resin constituting the outermost layer of the paint film is a polyurethane. The polyurethane has a polyisocyanate component and a polyol component as the constituent components. The polyol component of the polyurethane used in the present invention preferably includes a linear olefin diol. The olefin diol is preferably a compound having a linear main chain which includes a olefin backbone having an ethylenically unsaturated carbon-carbon double bond, and hydroxy groups at both terminals of the main chain.

The polyurethane used in the present invention is preferably a polyurethane obtained by a reaction between (A) a polyol composition and (B) a polyisocyanate composition. First, the polyol composition and polyisocyanate composition will be explained.

(A) The polyol composition contains a polyol having at least two hydroxy groups. (A) The polyol composition preferably contains a linear olefin diol as the polyol component.

The olefin monomer constituting the olefin dial is not limited, as long as it is a hydrocarbon having a polymerizable unsaturated carbon-carbon double bond. The olefin is preferably a cycloolefin. In other words, the olefin dial is preferably a poly(cycloolefin) diol. The poly(cycloolefin) diol is a ring-opening polymer of the cycloolefin. In other words, the poly(cycloolefin) diol is a compound having a linear main chain which includes a backbone formed by ring-opening polymerization of the cycloolefin, and hydroxy groups at both terminals of the main chain.

The olefin dial is preferably obtained by ring-opening polymerization of the cycloolefin monomer, more preferably obtained by ring-opening metathesis polymerization of the cycloolefin monomer.

In the double bond existing in the repeating unit constituting the olefin diol, the cis/trans ratio (molar ratio) is not particularly limited, but the cis/trans ratio (molar ratio) is preferably 10/90 or more, and is preferably 40/60 or less, more preferably 30/70 or less. The cis/trans ratio can be determined by measuring $^{13}$C-NMR spectrum of the cycloolefin ring-opening polymer.

The olefin diol can be obtained, for example, by polymerizing the cycloolefin monomer using a metathesis polymerization catalyst and a chain transfer agent represented by the general formula (1) which will be described later.
(Cycloolefin Monomer)

The cycloolefin monomer is a compound having a cyclic structure formed of carbon atoms, and a polymerizable carbon-carbon double bond in the cyclic structure. In the present specification, the "polymerizable carbon-carbon double bond" means a carbon-carbon double bond involved in the chain polymerization (ring-opening metathesis polymerization).

Examples of the cyclic structure of the cycloolefin monomer include a monocycle, a polycycle, a fused polycycle, a bridged cycle, and a polycycle which is a combination of them. The number of carbon atom constituting each cyclic structure is not particularly limited, but the number of carbon atom is preferably four or more, more preferably five or more, and is preferably thirty or less, more preferably twenty or less, and even more preferably fifteen or less. The cycloolefin monomer may have a hydrocarbon group having 1 to 30 carbon atoms such as an alkyl group, an alkenyl group, an alkylidene group and an aryl group. The hydrocarbon group having 1 to 30 carbon atoms may have a polar group such as a carboxy group and acid anhydride group, as a substituent group.

The cycloolefin monomer is preferably a monocylic cycloolefin monomer or a polycylic cycloolefin monomer.

Examples of the monocylic cycloolefin monomer include cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, and cycloheptene. Among them, the monocylic cycloolefin monomer is preferably cyclopentene.

Examples of the polycylic cycloolefin monomer include a compound having a norbornene ring (hereinafter sometimes referred to as "norbornene compound"). Examples of the polycylic cycloolefin monomer include dicyclopentadienes such as dicyclopentadiene, methyldicyclopentadiene and dihydrodicyclopentadiene (also referred to as tricyclo[5.2.1.0 $^{2,6}$]dec-8-ene); tetracyclododecenes such as tetracyclo[6.2.1.1 $^{3,5}$.0 $^{2,7}$]dodec-4-ene, 9-methyltetracyclo[6.2.1.1 $^{3,6}$.0 $^{2,7}$]dodec-4-ene, 9-ethyltetracyclo[6.2.1.1 $^{3,8}$.0 $^{2,7}$]dodec-4-ene, 9-cyclohexyltetracyclo[6.2.1.1 $^{3,6}$.0 $^{2,7}$]dodec-4-ene, 9-cyclopentyltetracyclo[6.2.1.1 $^{3,6}$.0 $^{2,7}$]dodec-4-ene, 9-methylenetetracyclo[6.2.1.1 $^{3,6}$.0 $^{2,7}$]dodec-4-ene, 9-ethylidenetetracyclo[6.2.1.1 $^{3,6}$.0 $^{2,7}$]dodec-4-ene, 9-vinyltetracyclo[6.2.1.1 $^{3,6}$.0 $^{2,7}$]dodec-4-ene, 9-propenyl tetracyclo[6.2.1.1 $^{3,6}$.0 $^{2,7}$]dodec-4-ene, 9-cyclohexenyltetracyclo[6.2.1.1 $^{3,6}$.0 $^{2,7}$]dodec-4-ene, 9-cyclopentenyltetracyclo[6.2.1.1 $^{3,6}$.0 $^{2,7}$]dodec-4-ene, and 9-phenyltetracyclo[6.2.1.1 $^{3,6}$.0 $^{2,7}$]dodec-4-ene; and norbornenes such as 2-norbornene, 5-methyl-2-norbornene, 5-ethyl-2-norbornene, 5-butyl-2-norbornene, 5-hexyl-2-norbornene, 5-decyl-2-norbornene, 5-cyclohexyl-2-norbornene, 5-cyclopentyl-2-norbornene, 5-ethylidene-2-norbornene, 5-vinyl-2-norbornene, 5-propenyl-2-norbornene, 5-cyclohexenyl-2-norbornene, 5-cyclopentenyl-2-norbornene, 5-phenyl-2-norbornene, tetracyclo[9.2.1.0 $^{2,10}$.0 $^{3,8}$]tetradeca-3,5,7,12-tetraene (also referred to as 1,4-methano-1,4,4a,9a-tetrahydro-9H-fluorene), tetracyclo[10.2.1.0 $^{2,11}$.0 $^{4,9}$]pentadeca-4,6,8,13-tetraene (also referred to as 1,4-methano-1,4,6,8,9,9a,10-hexahydroanthracene). Among them, the polycylic cycloolefin monomer is preferably 2-norbornene, dicyclopentadiene, tetracyclo[9.2.1.0 $^{2,10}$.0 $^{3,8}$]tetradeca-3,5,7,12-tetraene, or tetracyclo[6.2.1.1 $^{3,6}$.0 $^{2,7}$]dodec-4-ene.

The cycloolefin monomer may be used solely, or two or more of them may be used in combination.

The olefin diol used in the present invention is preferably a copolymer having a monomer unit obtained by the ring-opening polymerization of the monocylic cycloolefin monomer and a monomer unit obtained by the ring-opening polymerization of the polycylic cycloolefin monomer, more preferably a copolymer consisting of a monomer unit obtained by the ring-opening polymerization of the monocylic cycloolefin monomer and a monomer unit obtained by the ring-opening polymerization of the polycylic cycloolefin monomer. If the olefin diol includes the monomer unit obtained by the ring-opening polymerization of the polycylic cycloolefin monomer as the co-polymerization component, the obtained olefin diol tends to be liquefied.

The amount of the monomer unit obtained by the ring-opening polymerization of the monocylic cycloolefin monomer in 100 mass % of the total monomer units constituting the olefin diol is preferably 60 mass % or more, more preferably 65 mass % or more, and even more preferably 70 mass % or more, and is preferably 95 mass % or less, more preferably 92 mass % or less, and even more preferably 90 mass % or less.

The amount of the monomer unit obtained by the ring-opening polymerization of the polycylic cycloolefin monomer in 100 mass % of the total monomer units constituting the olefin diol is preferably 5 mass % or more, more preferably 8 mass % or more, and even more preferably 10 mass % or more, and is preferably 40 mass % or less, more preferably 35 mass % or less, and even more preferably 30 mass % or less.

The composition ratio of the monomer units in the cycloolefin ring-opening copolymer can be obtained, for example, by measuring $^1$H-NMR spectrum.

The olefin diol used in the present invention is preferably a cyclopentene-norbornene ring-opening copolymer having a monomer unit obtained by the ring-opening polymerization of the cyclopentene which is used as the monocylic cycloolefin monomer, and a monomer unit obtained by the ring-opening polymerization of the norbornene compound which is used as the polycylic cycloolefin monomer. The cyclopentene-norbornene ring-opening copolymer preferably consists of the monomer unit obtained by the ring-opening polymerization of the cyclopentene, and the monomer unit obtained by the ring-opening polymerization of the norbornene compound.

(Metathesis Polymerization Catalyst)

The metathesis polymerization catalyst used in the present invention is not particularly limited, as long as it catalyzes the ring-opening metathesis polymerization of the cycloolefin monomer.

Examples of the metathesis polymerization catalyst include a complex having a transition metal atom as a center and a plurality of ions, atoms, polyatomic ions and/or compounds bonding to the center. As the transition metal atom, the atoms of Groups 5, 6 and 8 (long period type periodic table, the same is applied below.) can be used. The atom of each group is not particularly limited. As the atom of Group 5, tantalum is preferable. As the atom of Group 6, molybdenum or tungsten is preferable. As the atom of Group 8, ruthenium or osmium is preferable.

Among them, the complex of ruthenium or osmium of Group 8 is preferable, ruthenium carbene complex is particularly preferable. The ruthenium carbene complex has excellent catalytic activity in bulk polymerization, and thus can effectively produce a resinous molded product having little smell coming from residual unreacted monomers. In addition, the complex of ruthenium or osmium of Group 8 is relatively stable against moisture in air, or oxygen, and is hardly inactivated Examples of the ruthenium carbene complex include:
ruthenium complex compounds having one heteroatom-containing carbene compound and one electron neutral donative compound other than the heteroatom-containing carbene compound, such as benzylidene (1,3-dimesityl-4-imidazolidine-2-ylidene) (tricyclohexylphosphine) ruthenium dichloride, benzylidene (1,3-dimesityl-4,5-dibromo-4-imidazolin-2-ylidene) (tricyclohexylphosphine) ruthenium dichloride, (1,3-dimesityl-4-imidazolin-2-ylidene) (3-phenyl-1H-indene-1-ylidene) (tricyclohexylphosphine) ruthenium dichloride, (1,3-dimesityl-4-imidazolidine-2-ylidene) (3-methyl-2-butene-1-ylidene) (tricyclopentylphosphine) ruthenium dichloride, benzylidene (1,3-dimesityl-octahydrobenzimidazole-2-ylidene) (tricyclohexylphosphine) ruthenium dichloride, benzylidene[1,3-di(1-phenylethyl)-4-imidazolin-2-ylidene] (tricyclohexylphosphine) ruthenium dichloride, benzylidene (1,3-dimesityl-2,3-dihydrobenzimidazole-2-ylidene) (tricyclohexylphosphine) ruthenium dichloride, benzylidene (tricyclohexylphosphine) (1,3,4-triphenyl-2,3,4,5-tetrahydro-1H-1,2,4-triazole-5-ylidene) ruthenium dichloride, (1,3-diisopropylhexahydropyrmidine-2-ylidene) (ethoxymethylene) (tricyclohexylphosphine) ruthenium dichloride, benzylidene (1,3-dimesityl-4-imidazolidine-2-ylidene) pyridine ruthenium dichloride, (1,3-dimesityl-4-imidazolidine-2-ylidene) (2-phenylethylidene)

(tricyclohexylphosphine) ruthenium dichloride, (1,3-dimesityl-4-imidazolin-2-ylidene) (2-phenylethylidene) (tricyclohexylphosphine) ruthenium dichloride, (1,3-dimesityl-4,5-dibromo-4-imidazolin-2-ylidene) [(phenylthio)methylene] (tricyclohexylphosphine) ruthenium dichloride, and (1,3-dimesityl-4,5-dibromo-4-imidazolin-2-ylidene) (2-pyrrolidone-1-ylmethylene) (tricyclohexylphosphine) ruthenium dichloride:

ruthenium complex compounds having two electron neutral donative compounds other than the heteroatom-containing carbene compound, such as benzylidene bis(tricyclohexylphosphine) ruthenium dichloride, and (3-methyl-2-butene-1-ylidene) bis(tricyclopentylphosphine) ruthenium dichloride; and ruthenium complex compounds having two heteroatom-containing carbene compounds, such as benzylidene bis(1,3-dicyclohexyl-4-imidazolidine-2-ylidene) ruthenium dichloride, and benzylidene bis(1,3-diisopropyl-4-imidazolin-2-ylidene) ruthenium dichloride.

Other examples of the ruthenium carbene complex include (1,3-dimesityl-4-imidazolidine-2-ylidene) (phenylvinylidene) (tricyclohexylphosphine) ruthenium dichloride, (t-butylvinylidene) (1,3-diisopropyl-4-imidazolin-2-ylidene) (tricyclopentylphosphine) ruthenium dichloride, and bis(1,3-dicyclohexyl-4-imidazolin-2-ylidene)phenylvinylidene ruthenium dichloride.

The amount of the metathesis polymerization catalyst generally ranges from 1:2,000 to 1:2,000,000, preferably ranges from 1:5,000 to 1:1,000,000, more preferably ranges from 1:10,000 to 1:500,000, in a molar ratio (metal atom in catalyst:cycloolefin monomer).

The metathesis polymerization catalyst can be dissolved or suspended in a small amount of an inert solvent for use if desired. Examples of the solvent include a chain aliphatic hydrocarbon such as n-pentane, n-hexane, n-heptane, liquid paraffin and mineral spirit, an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroindene and cyclooctane: an aromatic hydrocarbon such as benzene, toluene and xylene; a nitrogen-containing hydrocarbon such as nitromethane, nitrobenzene and acetonitrile; and an oxygen-containing hydrocarbon such as diethyl ether and tetrahydrofuran. Among them, the aromatic hydrocarbon, aliphatic hydrocarbon and alicyclic hydrocarbon generally used in industry are preferably used. In addition, a liquid antioxidant, a liquid plasticizer or a liquid elastomer can be used as a solvent, as long as they do not lower the activity of the metathesis polymerization catalyst.

The metathesis polymerization catalyst can also be used in combination with an activator (co-catalyst) for a purpose of controlling the polymerization activity and enhancing the polymerization reaction rate.

As the activator, an alkylide, halide, alkoxide, aryloxide or the like of aluminum, scandium or tin can be used Specific examples of the activator include trialkoxy aluminum, triphenoxy aluminum, dialkoxyalkyl aluminum, alkoxydialkyl aluminum, trialkyl aluminum, dialkoxy aluminum chloride, alkoxyalkyl aluminum chloride, dialkyl aluminum chloride, trialkoxy scandium, tetraalkoxy titanium, tetraalkoxy tin, and tetraalkoxy zirconium.

The amount of the activator generally ranges from 1:0.05 to 1:100, preferably ranges from 1:0.2 to 1:20, more preferably ranges from 1:0.5 to 1:10, in a molar ratio (metal atom in catalyst:activator).

In addition, when the complex of the transition metal atom of Group 5 and Group 6 is used as the metathesis polymerization catalyst, the metathesis polymerization catalyst and the activator are both preferably dissolved in the monomer for use, but the metathesis polymerization catalyst and the activator can be suspended or dissolved in a small amount of a solvent for use, unless the properties of the product are essentially impaired.

(Chain Transfer Agent)

When performing the ring-opening metathesis polymerization of the cycloolefin monomer, a compound represented by the following general formula (1) is preferably used as a chain transfer agent.

$$HO-X-CH=CH-Y-OH \qquad (1)$$

In the general formula (1), X and Y each independently represent an alkylene group having 1 to 30 carbon atoms. The alkylene group of X and Y preferably has 1 carbon atom or more, more preferably 2 carbon atoms or more, and even more preferably 3 carbon atoms or more, and preferably has 20 carbon atoms or less, more preferably 15 carbon atoms or less, and even more preferably carbon atoms 10 or less. The alkylene group may be either linear or branched.

If the chain transfer agent represented by the general formula (1) is contained, —OH group deriving from the chain transfer agent bonds at both terminals of the cycloolefin polymer. In other words, the olefin diol having hydroxy groups at both terminals of the main chain having the ring-opened cycloolefin backbone as the repeating unit is obtained.

Specific examples of the alkylene group of X or Y include a methylene group, an ethylene group, a propylene group, a butylene group, a pentylene group, a hexylene group, a heptylene group, an octylene group, a nonylene group, and a decylene group.

Specific examples of the chain transfer agent include butenediol (e.g. 2-butene-1,2-diol), pentenediol, hexenediol (e.g. 3-hexene-2,5-diol), octene diol (e.g. 4-octene-1,8-diol), and nonene diol.

The amount of the chain transfer agent is preferably 0.01 part by mass or more, more preferably 0.1 part by mass or more, and is preferably 10 parts by mass or less, more preferably 5 parts by mass or less, with respect to 100 parts by mass of the cycloolefin monomer.

(Other Agents)

In the ring-opening metathesis polymerization of the cycloolefin monomer, other agents such as a polymerization adjusting agent, polymerization reaction retardant, reactive fluidizer, flame retardant, antioxidant, and coloring material can be added if desired, in addition to the cycloolefin monomer, metathesis polymerization catalyst, and chain transfer agent.

The polymerization adjusting agent is added for a purpose of controlling the polymerization activity or enhancing the polymerization reaction rate. Specific examples of the polymerization adjusting agent include trialkoxy aluminum, triphenoxy aluminum, dialkoxyalkyl aluminum, alkoxydialkyl aluminum, trialkyl aluminum, dialkoxy aluminum chloride, alkoxyalkyl aluminum chloride, dialkyl aluminum chloride, trialkoxy scandium, tetraalkoxy titanium, tetraalkoxy tin, and tetraalkoxy zirconium. These polymerization adjusting agents may be used solely, or two or more of them may be used in combination. The amount of the polymerization adjusting agent generally ranges from 1:0.05 to 1:100, preferably ranges from 1:0.2 to 1:20, more preferably ranges from 1:0.5 to 1:10, in a molar ratio (metal atom in metathesis polymerization catalyst:polymerization adjusting agent).

The metathesis polymerization reaction of the cycloolefin monomer can be conducted without a solvent, or conducted in a solution. When the polymerization is conducted in the solution, the used solvent is not particularly limited, as long as the solvent is inert in the polymerization reaction and can dissolve the cycloolefin monomer, ruthenium carbene complex or the like used in the polymerization, and a hydrocarbon solvent or halogen-based solvent is preferably used. Examples of the hydrocarbon solvent include an aromatic hydrocarbon such as benzene, toluene, xylene and ethylbenzene; an aliphatic hydrocarbon such as n-hexane, n-heptane and n-octane; and an alicyclic hydrocarbon such as cyclohexane, cyclopentane and methylcyclohexane. In addition, examples of the halogen-based solvent include an alkyl halide such as dichloromethane and chloroform; and an aryl halide such as chlorobenzene and dichlorobenzene.

In addition, from the viewpoint of well dissolving the chain transfer agent having the hydroxy group and the polymerization catalyst having the ruthenium compound, an ether solvent or ketone solvent is preferably used as the polymerization solvent. Examples of the ether solvent include diethyl ether, cyclopentylmethyl ether, 1,2-dimethoxy ethylene, and tetrahydrofuran. Examples of the ketone solvent include acetone, 2-butanone, acetophenone acetone, methyl isopropyl ketone, methyl n-butyl ketone, methyl isobutyl ketone, methyl amyl ketone, methyl isoamyl ketone, methyl n-hexyl ketone, and methyl nonyl ketone. These solvents can be used solely, or two or more of them may be used in combination.

The polymerization temperature of the cycloolefin monomer is preferably −100° C. or more, more preferably −50° C. or more, even more preferably 0° C. or more, and most preferably 20° C. or more. In addition, the upper limit of the polymerization temperature is not particularly limited, but the polymerization temperature is preferably less than 100° C., more preferably less than 90° C.; even more preferably less than 80° C., and most preferably less than 70° C. If the polymerization temperature is excessively high, the obtained cycloolefin ring-opening polymer may has excessively low molecular weight, and if the polymerization temperature is excessively low, the polymerization speed is slow, and as a result, the productivity may be poor.

In addition, the time of the polymerization reaction preferably ranges from 1 minute to 72 hours, more preferably ranges from 5 hours to 20 hours. When the polymerization conversion rate reaches a predetermined value, a conventional polymerization terminating agent is added to the polymerization system to terminate the polymerization, by which the cycloolefin ring-opening polymer is obtained.

The olefin diol is preferably liquid at normal temperature. The viscosity of the olefin diol at 25° C. is preferably 50 mPa·s or more, more preferably 100 mPa·s or more, and even more preferably 300 mPa·s or more, and is preferably 30000 mPa·s or less, more preferably 20000 mPa·s or less, and even more preferably 15000 mPa·s or less.

The glass transition temperature (Tg) of the olefin diol is preferably −90° C. or more, more preferably −85° C. or more, and even more preferably −80° C. or more, and is preferably 0° C. or less, more preferably −20° C. or less, and even more preferably −30° C. or less.

The number average molecular weight of the olefin diol is preferably 800 or more, more preferably 900 or more, and even more preferably 1000 or more, and is preferably 6000 or less, more preferably 5000 or less, and even more preferably 4000 or less. If the number average molecular weight of the olefin diol is 800 or more, the distance between crosslinking points in the paint film becomes long and the paint film becomes soft, thus the spin performance is enhanced. If the number average molecular weight of the olefin diol is 6000 or less, the distance between crosslinking points in the paint film does not become excessively long, thus the stain resistance of the paint film becomes better. It is noted that the number average molecular weight of the olefin diol component can be determined by GPC.

It is noted that the olefin diol used in the present invention excludes a diene polymer having hydroxy groups at both terminals of the molecular chain (e.g. both-end hydroxy group-terminated polybutadiene (Poly bd R-45HT available from Idemitsu Kosan Co., Ltd.), both-end hydroxy group-terminated polypentadiene, and both-end hydroxy group-terminated polyhexadiene).

In a preferable embodiment of the present invention, (A) the polyol composition contains the linear olefin diol as the polyol component. In addition, in a more preferable embodiment of the present invention, (A) the polyol composition contains a urethane polyol, and the urethane polyol includes the linear olefin diol as a constituent component.

The urethane polyol is a compound having a plurality of urethane bonds in the molecule and having two or more hydroxyl groups in one molecule. Examples of the urethane polyol include a urethane prepolymer obtained by a reaction between a polyol and a polyisocyanate under a condition that the amount of hydroxyl groups in the polyol is excessive to the amount of isocyanate groups in the polyisocyanate.

In a more preferable embodiment of the present invention, a first polyol component constituting the urethane polyol contains the linear olefin diol. The details of the olefin diol have been described as above.

The first polyol component constituting the urethane polyol may contain other polyol in addition to the olefin diol.

Examples of the other polyol include a low molecular weight polyol component having a molecular weight of less than 500, and a high molecular weight polyol component having an average molecular weight of at least 500. Examples of the low molecular weight polyol component include a diol such as ethylene glycol, diethylene glycol, triethylene glycol, 1,3-butane diol, 1,4-butane diol, neopentyl glycol, and 1,6-hexane diol; and a triol such as glycerin, trimethylolpropane, and hexane triol. Examples of the high molecular weight polyol component include a polyether diol and a polyester diol. The first polyol component may be used solely, or at least two of them may be used in combination.

Examples of the polyether diol constituting the urethane polyol include polyoxyethylene glycol, polyoxypropylene glycol, and polyoxytetramethylene glycol. Among them, polyoxytetramethylene glycol is preferable.

The urethane polyol preferably includes the triol component and the diol component as the polyol component. As the triol component, trimethylolpropane is preferable. The mixing ratio of the triol component to the diol component (triol component/diol component) is preferably 1.0 or more, more preferably 1.2 or more, and is preferably 2.6 or less, more preferably 2.4 or less, in a molar ratio of OH group.

The polyol composition may contain a second polyol as the polyol component, in addition to the urethane polyol. In other words, the second polyol is a polyol directly contained in the polyol composition, other than a polyol constituting the urethane polyol. Examples of the second polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate: and an acrylic polyol. The second polyol may be used solely, or at least two of them may be used in combination.

The amount of the urethane polyol in the polyol contained in the polyol composition is preferably 60 mass % or more, more preferably 70 mass % or more, and even more preferably 80 mass % or more. The polyol of the polyol composition also preferably consists of the urethane polyol.

The first polyisocyanate component constituting the urethane polyol is not particularly limited, as long as the polyisocyanate component has at least two isocyanate groups. Examples of the polyisocyanate component include an aromatic polyisocyanate such as 2,4-toluene diisocyanate, 2,6-toluene diisocyanate, a mixture of 2,4-toluene diisocyanate and 2,6-toluene diisocyanate (TDI), 4,4-diphenylmethane diisocyanate (MDI), 1,5-naphthylene diisocyanate (NDI), 3,3'-bitolylene-4,4-diisocyanate (TODI), xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These polyisocyanates may be used solely or as a mixture of at least two of them.

The amount of the olefin diol included in the urethane polyol is preferably 55 mass % or more, more preferably 58 mass % or more, and even more preferably 60 mass % or more. The olefin diol forms a soft segment in the paint film. Therefore, if the amount of the olefin diol is 55 mass % or more, the obtained golf ball has further enhanced spin performance.

The number average molecular weight of the urethane polyol is preferably 1500 or more, more preferably 2000 or more, and even more preferably 2500 or more, and is preferably 100000 or less, more preferably 80000 or less, and even more preferably 50000 or less. If the number average molecular weight of the urethane polyol is 1500 or more, the distance between crosslinking points in the paint film becomes long and the paint film becomes soft, thus the spin performance is enhanced. If the number average molecular weight of the urethane polyol is 100000 or less, the distance between crosslinking points in the paint film does not become excessively long, thus the stain resistance of the paint film becomes better. It is noted that the number average molecular weight of the urethane polyol may be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

The hydroxyl value of the urethane polyol is preferably 10 mgKOH/g or more, more preferably 15 mgKOH/g or more, and even more preferably 20 mgKOH/g or more, and is preferably 200 mgKOH/g or less, more preferably 190 mgKOH/g or less, and even more preferably 180 mgKOH/g or less.

The hydroxyl value of the polyol contained in the polyol composition is preferably 10 mgKOH/g or more, more preferably 15 mgKOH/g or more, and even more preferably 20 mgKOH/g or more, and is preferably 400 mgKOH/g or less, preferably 300 mgKOH/g or less, more preferably 200 mgKOH/g or less, even more preferably 170 mgKOH/g or less, and most preferably 160 mgKOH/g or less. If the hydroxyl value of the polyol component falls within the above range, the adhesion of the paint film to the golf ball body is enhanced. It is noted that in the present invention, the hydroxyl value can be measured according to JIS K 1557-1, for example, by an acetylation method.

Next, the polyisocyanate composition will be explained. The polyisocyanate composition contains one polyisocyanate or at least two polyisocyanates. Examples of the polyisocyanate include a compound having at least two isocyanate groups. It is noted that the polyisocyanate directly contained in the polyisocyanate composition is sometimes referred to as the second polyisocyanate from the viewpoint of distinguishing it from the first polyisocyanate constituting the urethane polyol.

Examples of the second polyisocyanate include an aromatic diisocyanate such as 2,4-toluene diisocyanate. 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); an alicyclic diisocyanate or aliphatic diisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI); and a triisocyanate such as an allophanate-modified product, biuret-modified product, isocyanurate-modified product or adduct-modified product of these diisocyanates.

In the present invention, as the polyisocyanate, only one polyisocyanate is preferably used, but two or more polyisocyanates may be used. When only one polyisocyanate is used, the isocyanurate-modified product of HDI, the adduct-modified product of HDI, or the biuret-modified product of HDI is preferable, and the isocyanurate-modified product of HDI is most preferable. This is because the loss elastic modulus of the obtained polyurethane at a temperature of −50° C. is greater.

The allophanate-modified product is, for example, a triisocyanate obtained by further reacting a diisocyanate with a urethane bond formed through a reaction between a diisocyanate and a low molecular weight diol. The adduct product is a triisocyanate obtained through a reaction between a diisocyanate and a low molecular weight triol such as trimethylolpropane or glycerin. The biuret-modified product is, for example, a triisocyanate having a biuret bond represented by the following chemical formula (2). The isocyanurate-modified product of diisocyanate is, for example, a triisocyanate represented by the following chemical formula (3).

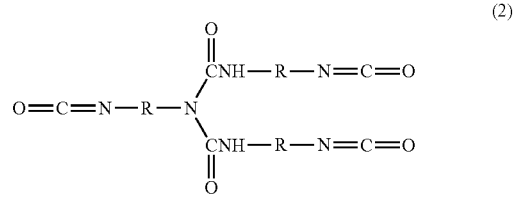

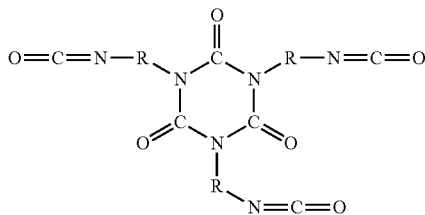

(3)

[In the chemical formulae (2) and (3), R represents a residue where isocyanate groups are removed from the diisocyanate.]

The polyisocyanate composition preferably contains the triisocyanate compound. The amount of the triisocyanate compound in the polyisocyanate contained in the polyisocyanate composition is preferably 50 mass % or more, more preferably 60 mass % or more, and even more preferably 70 mass % or more. It is most preferable that the polyisocyanate contained in the polyisocyanate composition consists of the triisocyanate compound.

The amount (NCO %) of the isocyanate group of the polyisocyanate contained in the polyisocyanate composition is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the amount (NCO %) of the isocyanate group of the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800. Burnock DN-950, and Burnock DN-955 available from DIC corporation: Desmodur N75MPA/X, Desmodur N3300. Desmodur L75 (C), and Sumidur E21-1 available from Sumika Bayer Urethane Co., Ltd.; Coronate HX, and Coronate HK available from Japan Polyurethane Industry Co, Ltd.; Duranate 24A-100, Duranate 21S-75E, Duranate TPA-100, and Duranate TKA-100 available from Asahi Kasei Chemicals Corporation; and VESTANAT T1890 available from Degussa Co., Ltd.

The polyurethane used in the present invention preferably includes the isocyanurate-modified product of diisocyanate as the polyisocyanate component. The diisocyanate is preferably hexamethylene diisocyanate and/or isophorone diisocyanate.

The base resin constituting the outermost layer of the paint film of the golf ball according to the present invention contains the polyurethane obtained by the reaction between the polyol composition and the polyisocyanate composition. In the reaction between the polyol composition and the polyisocyanate composition, the molar ratio (NCO group/OH group) of the isocyanate group (NCO group) included in the polyisocyanate composition to the hydroxy group (OH group) included in the polyol composition is preferably 0.5 or more, more preferably 0.6 or more, and even more preferably 0.8 or more. If the molar ratio (NCO group/OH group) is 0.5 or more, the crosslinking density is greater and thus the obtained paint film has better stain resistance. In addition, if the molar ratio (NCO group/OH group) is excessively great, the amount of the isocyanate group becomes excessive, and thus the obtained paint film may become hard and fragile, and the appearance thereof may deteriorate. For this reason, the molar ratio (NCO group/OH group) is preferably 2.0 or less, more preferably 1.8 or less, and even more preferably 1.6 or less. It is noted that the reason why the appearance of the obtained paint film deteriorates if the amount of the isocyanate group is excessive in the paint is considered that an excessive amount of the isocyanate group may promote a reaction between the moisture in the air and the isocyanate group, thereby generating a lot of carbon dioxide gas.

The paint film of the golf ball according to the present invention is preferably formed from a paint containing the polyol composition and the polyisocyanate composition Examples of the paint include a so-called two-component curing type paint including a first agent containing the polyol composition and a second agent containing the polyisocyanate composition. The paint may be either a waterborne paint mainly containing water as a dispersion medium or a solvent-based paint containing an organic solvent as a dispersion medium. In case of the solvent-based paint, preferable examples of the solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate In the two-component curing type paint, the total amount of the solid component of the first agent and second agent is preferably 30 mass % or more, more preferably 31 mass % or more, and even more preferably 32 mass % or more, and is preferably 45 mass % or less, more preferably 44 mass % or less, and even more preferably 43 mass % or less. If the amount of the solid component is 30 mass % or more, it is easy to uniformly apply the paint, thus the paint film has a more uniform thickness, and if the amount of the solid component is 45 mass % or less, the paint has a better leveling property and the unevenness of the paint film surface is decreased, thus the golf ball has a better appearance.

The paint may further contain additives generally contained in a paint for a golf ball, such as a filler, an ultraviolet absorber, an antioxidant, a light stabilizer, a fluorescent brightener, an anti-blocking agent, a leveling agent, a slip agent, and a viscosity modifier, where necessary.

Next, the method of applying the curing type paint according to the present invention will be explained. The method of applying the curing type paint is not particularly limited, a conventional method can be adopted, and examples thereof include a spray coating and electrostatic coating.

In the case of performing the spray coating with an air gun, the polyol component and the polyisocyanate component are fed with respective pumps and continuously mixed with a line mixer located in the stream line just before the air gun, and the obtained mixture is air-sprayed. Alternatively, the polyol and the polyisocyanate are air-sprayed respectively with an air spray system provided with a device for controlling the mixing ratio thereof. The paint application may be conducted by spraying the paint one time or over-spraying the paint multiple times.

The curing type paint applied on the golf ball body is dried, for example, at a temperature in a range of from 30° C. to 70° C. for 1 hour to 24 hours, to form the paint film.

The golf ball according to the present invention is not particularly limited, as long as the golf ball comprises a golf ball body and a paint film formed on a surface of the golf ball body and composed of at least one layer, wherein the base resin constituting the outermost layer of the paint film is the polyurethane obtained by the reaction between (A) the polyol composition and (B) the polyisocyanate composition.

In the case that the paint film is single layered, the base resin of the single layered paint film includes the polyurethane obtained by the reaction between (A) the polyol composition and (B) the polyisocyanate composition.

In the case that the paint film has a multiple layered structure composed of at least two layers, the base resin constituting the outermost layer of the paint film includes the polyurethane obtained by the reaction between (A) the polyol composition and (B) the polyisocyanate composition. The base resin constituting the layer of the paint film other than the outermost layer of the paint film is not particularly limited, and examples thereof include a polyurethane, an epoxy resin, and an acrylic resin.

In a more preferable embodiment of the present invention, the golf ball comprises the golf ball body and two paint film layers formed on the surface of the golf ball body, wherein the base resin constituting the outer paint film layer is the polyurethane obtained by the reaction between (A) the polyol composition and (B) the polyisocyanate composition.

The thickness of the paint film of the golf ball according to the present invention is not particularly limited, and is preferably 5 μm or more, more preferably 6 μm or more, even more preferably 10 μm or more, and particularly preferably 15 μm or more. This is because if the thickness of the paint film is less than 5 μm, the paint film tends to be easily worn off due to the continued use of the golf ball, and thickening the paint film increases the spin rate on approach shots. Further, the thickness of the paint film is preferably 50 μm or less, more preferably 45 μm or less, and even more preferably 40 μm or less. This is because if the thickness of the paint film exceeds 50 μm, the dimple effect may be lowered, and the flight performance of the golf ball tends to be lowered. The thickness of the paint film can be measured, for example, by observing the cross section of the golf ball with a microscope (VHX-1000 available from Keyence Corporation). It is noted that in the case that the paint film has a multiple layered structure, a total thickness of the formed paint film preferably falls within the above range.

The golf ball according to the present invention is not particularly limited, as long as the golf ball comprises a golf ball body, and a paint film formed on a surface of the golf ball body and composed of at least one layer. The construction of the golf ball body is not particularly limited, and the golf ball body may be a one-piece golf ball, a two-piece golf ball, a multi-piece golf ball such as a three-piece golf ball, a four-piece golf ball, a five-piece golf ball and a multi-piece golf ball comprising more than five pieces, or a wound golf ball. The present invention can be suitably applied to any one of the above golf balls.

The FIGURE is a partially cutaway cross-sectional view of a golf ball according to one embodiment of the present invention. The golf ball 1 comprises a spherical core 2, a cover 3 covering the spherical core 2, and a paint film 4 formed on a surface of the cover 3. A plurality of dimples 31 are formed on the surface of the cover 3. Other portions than the dimples 31 on the surface of the cover 3 are lands 32.

The golf ball body preferably comprises a core and at least one cover layer covering the core. The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and preferably has a slab hardness of 80 or less, more preferably 70 or less in shore D hardness. If the cover composition has a slab hardness of 50 or more, the obtained golf ball has a higher launch angle and a lower spin rate on driver shots and iron shots, and thus travels a greater distance. In addition, if the cover composition has a slab hardness of 80 or less, the obtained golf ball has better durability. Further, in case of a so-called spin golf ball which focuses on controllability, the cover composition preferably has a slab hardness of less than 50 in Shore D hardness, and preferably has a slab hardness of 20 or more, more preferably 25 or more in shore D hardness. If the cover composition has a slab hardness of less than 50 in Shore D hardness, the spin rate on approach shots is greater. In addition, if the cover composition has a slab hardness of 20 or more in Shore D hardness, the abrasion resistance is enhanced.

The cover material constituting the cover is not particularly limited, and examples thereof include an ionomer resin; various resins such as a polyester resin, urethane resin (e.g. thermoplastic urethane resin or two-component curing type urethane resin) and polyamide resin: a thermoplastic polyamide elastomer having a trade name of "Pebax (registered trademark)" (e.g. "Pebax 2533")" available from Arkema K. K.; a thermoplastic polyester elastomer having a trade name of "Hytrel (registered trademark)" (e.g. "Hytrel 3548", "Hytrel 4047")" available from Du Pont-Toray Co., Ltd.; a thermoplastic polyurethane elastomer having a trade name of "Elastollan (registered trademark)" (e.g. "Elastollan XNY97A")" available from BASF Japan Ltd.; and a thermoplastic styrene elastomer having a trade name of "TEFABLOC (registered trademark)" or a thermoplastic polyester elastomer having a trade name of "Primalloy" available from Mitsubishi Chemical Corporation. These cover materials may be used solely, or two or more of these cover materials may be used in combination.

In addition to the resin component, the cover composition may further contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer (e.g. bis(2,2,6,6-tetramethyl-4-piperidyl) sebacate)), a fluorescent material or fluorescent brightener, as long as they do not impair the performance of the cover.

The method for molding the cover from the cover composition is not particularly limited, and examples thereof include a method of injection molding the cover composition directly onto the core; and a method of molding the cover composition into hollow shells, covering the core with a plurality of the hollow shells and compression molding the core with a plurality of the hollow shells (preferably a method of molding the cover composition into half hollow-shells, covering the core with two of the half hollow-shells and compression molding the core with two of the half hollow-shells). The golf ball body having the cover formed thereon is ejected from the mold, and as necessary, the golf ball body is preferably subjected to surface treatments such as deburring, cleaning, and sandblast. In addition, if desired, a mark may also be formed thereon.

The total number of the dimples formed on the cover is preferably 200 or more and 500 or less. If the total number of the dimples is less than 200, the dimple effect is hardly obtained, and if the total number of the dimples exceeds 500, the dimple effect is hardly obtained because the size of the respective dimples is small. The shape (shape in a plan view) of the dimples includes, for example, but is not limited to, a circle; a polygonal shape such as a roughly triangular shape, a roughly quadrangular shape, a roughly pentagonal shape, and a roughly hexagonal shape, and other irregular shape. The shape of the dimples may be employed solely, or two or more of the shapes may be employed in combination.

In the present invention, a ratio of the total area of all the dimples to the surface area of a phantom sphere is referred to as an occupation ratio. The phantom sphere is a golf ball (sphere) where no dimple exists. In the golf ball according to the present invention, the occupation ratio of the dimple is preferably 60% or more, more preferably 63% or more, and even more preferably 66% or more, and is preferably 90% or less, more preferably 87% or less, and even more preferably 84% or less. If the occupation ratio is excessively high, the paint film contributes little to the friction coefficient. In addition, if the occupation ratio is excessively low, the flight performance is lowered.

It is noted that the area of the dimple is an area of a region surrounded by the contour line of the dimple when the central point of the golf ball is viewed from infinity. In the case of a circular dimple, the area S is calculated by the following mathematical formula.

$$S=(Di/2)^2 \cdot \pi \text{ (}Di\text{: the diameter of the dimple)}$$

The golf ball preferably has a diameter in a range from 40 mm to 45 mm. In light of satisfying the regulation of US Golf Association (USGA), the diameter is preferably 42.67 mm or more. In light of prevention of air resistance, the diameter is preferably 44 mm or less, more preferably 42.80 mm or less. The golf ball preferably has a mass of 40 g or more and 50 g or less. In light of obtaining greater inertia, the mass is preferably 44 g or more, more preferably 45.00 g or more. In light of satisfying the regulation of USGA, the mass is preferably 45.93 g or less.

Next, the core used in a wound golf ball, two-piece golf ball and multi-piece golf ball, and the one-piece golf ball body will be explained.

The core and one-piece golf ball body can be formed from a conventional rubber composition (hereinafter sometimes simply referred to as "core rubber composition"). For example, the core and one-piece golf ball body can be molded by heat pressing a rubber composition containing a base rubber, a co-crosslinking agent and a crosslinking initiator.

As the base rubber, particularly preferred is a high-cis polybutadiene having a cis bond in an amount of 40 mass % or more, preferably 70 mass % or more, and more preferably 90 mass % or more in view of its superior resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, diphenyl disulfides, thiophenols or thionaphthols are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. The amount of the carboxylic acid and/or the salt thereof is preferably 1 part by mass or more and 40 parts by mass or less with respect to 100 parts by mass of the base rubber.

The core rubber composition may further contain a weight adjusting agent such as zinc oxide and barium sulfate, an antioxidant, a colored powder, or the like in addition to the base rubber, the co-crosslinking agent, the crosslinking initiator, and the organic sulfur compound. The molding conditions for heat pressing the core rubber composition may be determined appropriately depending on the rubber composition. Generally, the heat pressing is preferably carried out at a temperature in a range from 130° C. to 200° C. for 10 to 60 minutes, or carried out in a two-step heating of heating at a temperature in a range from 130° C. to 150° C. for 20 to 40 minutes followed by heating at a temperature in a range from 160° C. to 180° C. for 5 to 15 minutes.

In the case that the golf ball according to the present invention is a three-piece golf ball, a four-piece golf ball, or a multi-piece golf ball comprising five or more pieces, examples of the material used for the intermediate layer disposed between the core and the outmost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an α,β-unsaturated carboxylic acid; and a product obtained by neutralizing, with a metal ion, at least a part of carboxyl groups in a terpolymer composed of ethylene, an α,β-unsaturated carboxylic acid and an α,β-unsaturated carboxylic acid ester. The intermediate layer may further contain a weight adjusting agent such as barium sulfate and tungsten, an antioxidant, and a pigment. It is noted that the intermediate layer may be referred to as an inner cover layer or an outer core depending on the construction of the golf ball.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Weight Average Molecular Weight (Mw) and Number Average Molecular Weight (Mn) of Olefin Diol The weight average molecular weight (Mw) and number average molecular weight (Mn) of the olefin diol were measured with a gel permeation chromatography (GPC) system HLC-8220 (available from Tosoh Corporation) using two Type H columns HZ-M (available from Tosoh Corporation) connected in tandem as a column, tetrahydrofuran as a solvent, and differential refractometer RI-8320 (available from Tosoh Corporation) as a detector, at a column temperature of 40° C. The weight average molecular weight (Mw) and number average molecular weight (Mn) of the olefin diol were determined as a polystyrene conversion value.

(2) Glass Transition Temperature (Tg) of Olefin Diol

The measurement was conducted with a differential scanning calorimeter (DSC, trade name "X-DSC7000" available from Hitachi High-Tech Science Corporation) at a temperature increasing rate of 10° C./min in a range from −150° C. to 40° C. and the glass transition temperature (Tg) was determined based on the measured result.

(3) Viscosity of Olefin Diol

The melt viscosity at 25° C. was measured with a Brookfield type viscometer DV-II+Pro (available from Brookfield Corporation). A cone-plate type viscometer was adopted, and CPE-52 was used as the cone (spindle). In addition, the shear rate of the measurement was adjusted to a range from 1.2 $sec^{-1}$ to 10 $sec^{-1}$ based on the viscosity.

(4) Measurement of Dynamic Viscoelasticity

The storage elastic modulus E', loss elastic modulus E" and loss tangent tan δ of the paint film were measured under the following conditions.

Apparatus: Dynamic viscoelasticity measuring apparatus Rheogel-E4000 available from UBM CO., Ltd.

Test sample: A paint obtained by blending the base agent and the curing agent was dried and cured at the temperature of 40° C. for 4 hours to prepare a paint film having a thickness in a range of from 0.11 mm to 0.14 mm. The paint film was cut to prepare a test piece having a width of 4 mm and a distance between the clamps of 20 mm.

Measuring mode: sine wave tensile mode
Measuring temperature: −120° C. to 100° C.
Temperature increasing rate: 3° C./min
Measuring date capturing interval: 3° C.
Oscillation frequency: 10 Hz
Measuring strain: 0.05%

(5) 10% Modulus of Paint Film

The tensile property of the paint film was measured according to JIS K7161 (2014). Specifically, the polyisocyanate composition and the polyol composition were blended to prepare a paint, and the obtained paint was dried and cured at a temperature of 40° C. for 4 hours to prepare a paint film (thickness: 0.05 mm). The paint film was punched into the test piece type II (width of parallel part: 10 mm, gauge length: 50 mm) prescribed in JIS K 7127 (1999), to prepare a test piece. The tensile test of the test piece was conducted with a precision universal tester (Autograph (registered trademark) available from Shimadzu Corporation) under testing conditions of a length between grips: 100 mm, a tensile speed: 50 mm/min and a testing temperature: 23° C., and the tensile stress at 10% strain (10% modulus) was recorded.

(6) Dry Spin Rate Sd on Approach Shots (Rpm)

A sand wedge (RTX-3 (58°) available from Cleveland Golf Inc.) was installed on a swing machine available from Golf Laboratories. Inc. The golf ball was hit at a head speed of 16 m/sec. and the spin rate (rpm) thereof was measured by continuously taking a sequence of photographs of the hit golf ball. The measurement was conducted eight times for each golf ball, and the average value thereof was adopted as the spin rate.

(7) Rough Spin Rate Sr on Approach Shots from the Rough (Rpm)

A sand wedge (RTX-3 (58°) available from Cleveland Golf Inc.) was installed on a swing machine available from Golf Laboratories Inc. A golf ball having two pieces of wild grass attached on the surface was used, the golf ball was hit at a head speed of 16 m/s in a state that the wild grass was disposed between the face of the sand wedge and the golf ball, and the spin rate (rpm) was measured. A sequence of photographs of the hit golf ball were taken for measuring the spin rate. When the face of the sand wedge and the golf ball were contacted, the wild grass was attached to the golf ball with a cellophane tape such that the wild grass was perpendicular to the groove of the face. The measurement was conducted eight times for each golf ball, and the average value of the obtained data was calculated respectively.

[Production of Golf Ball]

1. Production of Center

The center rubber composition having the formulation shown in Table 1 was kneaded and heat-pressed in upper and lower molds, each having a hemispherical cavity, at 170° C. for 20 minutes to obtain the spherical center having a diameter of 39.7 mm. It is noted that the amount of barium sulfate was adjusted such that the ball had a mass of 45.3 g.

TABLE 1

| Center composition | | |
|---|---|---|
| Formulation (parts by mass) | Polybutadiene | 100 |
| | Zinc acrylate | 35 |
| | Zinc oxide | 5 |
| | Barium sulfate | Appropriate amount |
| | Diphenyl disulfide | 0.5 |
| | Dicumyl peroixde | 0.9 |

Polybutadiene rubber: "BR730 (high cis-polybutadiene)" available from JSR Corporation Zinc acrylate: "ZN-DA90S" available from Nisshoku Techno Fine Chemical Co., Ltd.

Zinc oxide: "Ginrei R" available from Toho Zinc Co., Ltd.

Barium sulfate: "Barium Sulfate BD" available from Sakai Chemical Industry Co., Ltd.

Diphenyl disulfide: available from Sumitomo Seika Chemicals Co., Ltd.

Dicumyl peroxide: "Percumyl (register trademark) D" available from NOF Corporation 2. Preparation of Intermediate Layer Composition and Cover Composition The materials having the formulations shown in Tables 2 and 3 were mixed with a twin-screw kneading extruder to prepare an intermediate layer composition and a cover composition in a pellet form. The extruding conditions of the intermediate layer composition and the cover composition were a screw diameter of 45 mm, a screw rotational speed of 200 rpm, and screw L/D=35, and the mixtures were heated to 200 to 260° C. at the die position of the extruder.

TABLE 2

| Intermediate layer composition | | |
|---|---|---|
| Formulation (parts by mass) | Surlyn 8945 | 55 |
| | Himilan AM7329 | 45 |
| | Titanium dioxide | 4 |

Surlyn (register trademark) 8945: sodium ion neutralized ethylene-methacrylic acid copolymer ionomer resin available from E.I. du Pont de Nemours and Company Himilan (register trademark) AM7329: zinc ion neutralized ethylene-methacrylic acid copolymer ionomer resin available from Dow-Mitsui Polychemicals Co., Ltd.

TABLE 3

| Cover composition | | |
|---|---|---|
| Formulation (parts by mass) | Elastollan XNY82A | 100 |
| | TINUVIN 770 | 0.2 |
| | Titanium dioxide | 4 |
| | Ultramarine Blue | 0.04 |
| Hardness (Shore D) | | 29 |

Elastollan (register trademark) XNY82A' thermoplastic polyurethane elastomer available from BASF Japan Ltd TINUVIN (register trademark) 770: bis(2,2,6,6-tetramethyl-4-piperidyl) sebacate) available from BASF Japan Ltd 3. Production of Spherical Core The intermediate layer composition obtained above was directly injection molded onto the spherical center to produce the spherical core with the intermediate layer (thickness: 1.0 mm) covering the center. The upper and lower molds for molding have a semispherical cavity and a retractable hold pin for holding the spherical center. When molding the intermediate layer, the hold pin was protruded to hold the charged center, and the intermediate layer composition heated to 260° C. was injected in 0.3 second into the mold held under a pressure of 80 tons, and cooled for 30 seconds. The mold was opened and the spherical core was ejected from the mold.

4. Molding of Half Shell

The compression molding of half shells was conducted as follows. The obtained cover composition in the pellet form was charged into each of the depressed part of the lower mold for molding half shells one by one, and a pressure was applied to mold the half shells. The compression molding was conducted under the following conditions, a molding temperature of 170° C. a molding time of 5 minutes, and a molding pressure of 2.94 MPa.

5. Molding of Cover

The spherical core obtained above was concentrically covered with two of the half shells, and compression molding was conducted to form the cover having a thickness of 0.5 mm. The compression molding was conducted under the following conditions: a molding temperature of 145° C., a molding time of 2 minutes, and a molding pressure of 9.8 MPa.

6. Preparation of Paint

Preparation of First Agent (Polyol Composition)

Polyoxytetramethylene glycol (PTMG) or olefin diol (PCP1 to PCP4), and trimethylolpropane (TMP) were dissolved as the polyol component in a solvent (toluene/methyl ethyl ketone=½ (mass ratio)) such that the polyol component had a concentration of 50 mass % in the solvent. Dibutyltin laurate was added as a catalyst into the above prepared solution in an amount of 0.1 mass % with respect to the solid component of the polyol component. While keeping the temperature of the polyol solution at a temperature of 80° C., isophorone diisocyanate (IPDI) was added dropwise therein as the polyisocyanate component, and mixed. After the dropwise addition was finished, stirring was continued until the isocyanate group disappeared. Then, the reaction liquid was cooled to normal temperature, and a solvent (toluene/methyl ethyl ketone=½ (mass ratio)) was added therein to prepare the urethane polyols (solid component: 30 mass %) The compositions and the like of the urethane polyols are shown in Table 4.

TABLE 4

| Urethane polyol No. | | 1 | 2 | 3 | 4 | 5 |
|---|---|---|---|---|---|---|
| Component | Polyol component | PTMG TMP | PCP1 TMP | PCP2 TMP | PCP3 TMP | PCP4 TMP |
| | Polyisocyanate component | IPDI | IPDI | IPDI | IPDI | IPDI |
| Number average molecular weight of PTMG or PCP | | 1000 | 1000 | 2000 | 3100 | 4100 |
| TMP:PTMG or PCP (molar ratio of OH group) | | 1.8:1.0 | 1.8:1.0 | 1.8:1.0 | 1.8:1.0 | 1.8:1.0 |
| Molar ratio of NCO group of polyisocyanate component to OH group of polyol component (NCO/OH) | | 0.6 | 0.6 | 0.6 | 0.6 | 0.6 |
| Amount of PTMG or PCP (mass %) | | 64 | 64 | 78 | 85 | 88 |
| Hydroxyl value of solid component (mgKOH/g) | | 83.0 | 83.0 | 50.5 | 36.3 | 28.3 |
| Number average molecular weight | | 8241 | 8305 | 1591 | 24296 | 33022 |

As the polyolefin diol, the following polyolefin diols were used.

PCP1: both-end hydroxy group-terminated liquid polycyclopentene (poly(cyclopentene) diol) (number average molecular weight: 1000) available from Zeon Corporation.

PCP2: both-end hydroxy group-terminated liquid polycyclopentene (poly(cyclopentene) diol) (number average molecular weight: 2000) available from Zeon Corporation PCP3: both-end hydroxy group-terminated liquid polycyclopentene (poly(cyclopentene) diol) (number average molecular weight 3100) available from Zeon Corporation PCP4: both-end hydroxy group-terminated liquid polycyclopentene (poly(cyclopentene) diol) (number average molecular weight: 4100) available from Zeon Corporation Preparation of Second Agent (Polyisocyanate Composition)

Polyisocyanate composition No. 1: isocyanurate-modified product of hexamethylene diisocyanate (Sumidur N3300 available from Sumika Covestro Urethane Co., Ltd.)

Polyisocyanate composition No. 2: mixture of isocyanurate-modified product of hexamethylene diisocyanate (Sumidur N3300 available from Sumika Covestro Urethane Co., Ltd.) and isocyanurate-modified product of isophorone diisocyanate (Desmodur Z4470 available from Sumika Covestro Urethane Co, Ltd.) in a molar ratio of 1:1

A mixed solvent of methyl ethyl ketone, n-butyl acetate and toluene was added as a solvent in the polyisocyanate compositions No. 1 to 2 to adjust the concentration of the polyisocyanate component to 60 mass %.

Preparation of Paint

The second agent was added in the first agent (urethane polyol) prepared above in the NCO/OH molar ratio shown in Table 5 to prepare the paints 7. Formation of Paint Film The surface of the golf ball bodies obtained above was treated with sandblast and marked. The paints were applied with a spray gun, and dried for 24 hours in an oven at a temperature of 40° C. to obtain golf balls having a diameter of 42.7 mm and a mass of 45.3 g. The paint films had a thickness of 20 μm. The golf ball body was placed in a rotating member provided with three prongs, the rotating member was allowed to rotate at 300 rpm, and application of the paint was conducted by spacing a spray distance (7 cm) between the air gun and the golf ball body while moving the air gun in an up and down direction. The painting interval in the overpainting operation was set to 1.0 second. Application of the paint was conducted under the air gun spraying conditions of overpainting: two times, a spraying air pressure: 0.15 MPa, a compressed air tank pressure: 0.10 MPa, a painting time for one application: 1 second, an atmosphere temperature: 20° C. to 27° C., and an atmosphere humidity: 65% or less. Evaluation results of the obtained golf balls are shown in Table 5.

TABLE 5

| | Golf ball No. | 1 | 2 | 3 | 4 | 5 | 6 | 7 | 8 | 9 | 10 |
|---|---|---|---|---|---|---|---|---|---|---|---|
| Paint | First agent  Urethane polyol No. | 1 | 2 | 3 | 4 | 5 | 1 | 2 | 3 | 1 | 3 |
| | Second agent (polyisocyanate composition) No. | 2 | 2 | 2 | 2 | 2 | 1 | 1 | 1 | 2 | 2 |
| | Second agent/first agent (NCO/OH molar ratio) | 0.5 | 0.5 | 0.6 | 1.8 | 1.8 | 1.2 | 1.2 | 1.8 | 0.6 | 1.2 |
| Properties of paint film | 10% modulus (kgf/cm$^2$) | 11 | 10 | 9 | 10 | 9 | 20 | 19 | 18 | 22 | 24 |
| | Peak temperature Tg of loss tangent (° C.) | 26 | −43 | −46 | −52 | −55 | 35 | −40 | −43 | 56 | −40 |
| | E' (10$^8$ Pa, 0° C., 10 Hz) | 2.8 | 0.5 | 0.3 | 0.2 | 0.1 | 3.1 | 0.7 | 0.4 | 7.8 | 0.5 |
| | E" (10$^8$ Pa, −50° C., 10 Hz) | 0.8 | 1.9 | 1.5 | 0.7 | 0.3 | 1.1 | 1.9 | 1.8 | 0.9 | 1.8 |
| Evaluation of golf ball | Dry spin rate Sd (rpm) | 5291 | 5273 | 5280 | 5277 | 5271 | 5231 | 5246 | 5251 | 5218 | 5255 |
| | Rough spin rate Sr (rpm) | 4053 | 4271 | 4203 | 4170 | 4161 | 4013 | 4231 | 4215 | 3856 | 4208 |
| | Retention rate Sr/Sd (%) | 77 | 81 | 80 | 79 | 79 | 77 | 81 | 80 | 74 | 80 |

The golf balls No. 2 to No. 5 and No. 7, 8, 10 are golf balls comprising a golf ball body, and a paint film formed on a surface of the golf ball body and composed of at least one layer, wherein a base resin constituting an outermost layer of the paint film includes a polyurethane obtained by a reaction between (A) a polyol composition and (B) a polyisocyanate composition, and the polyurethane has a loss elastic modulus (E") of 0.2×10$^8$ Pa or more at a temperature of −50° C. and a loss tangent (tan δ) having a peak temperature of 0° C. or less, obtained by measuring dynamic viscoelasticity of the polyurethane under specific conditions. The golf balls No. 2 to No. 5 and No. 7, 8, 10 have excellent spin performance.

The present invention is suitably used for a painted golf ball.

This application is based on Japanese patent application No. 2020-171228 filed on Oct. 9, 2020, the contents of which are hereby incorporated by reference.

The invention claimed is:

1. A golf ball comprising a golf ball body, and a paint film formed on a surface of the golf ball body and composed of at least one layer, wherein
a base resin constituting an outermost layer of the paint film includes a polyurethane, and
the polyurethane has a loss elastic modulus (E") of 0.2×10$^8$ Pa or more at a temperature of −50° C. and a loss tangent (tan δ) having a peak temperature of 0° C. or less, obtained by measuring dynamic viscoelasticity of the polyurethane under following conditions:
<measuring conditions>
measuring mode: sine wave tensile mode
measuring temperature range: −120° C. to 100° C.
Temperature increasing rate: 3° C./min
oscillation frequency: 10 Hz
measuring strain: 0.05%.

2. The golf ball according to claim 1, wherein the peak temperature of the loss tangent (tan δ) is less than −40° C.

3. The golf ball according to claim 1, wherein the polyurethane has a storage elastic modulus (E') of 0.05×10$^8$ Pa or more and 3.0×10$^8$ Pa or less at a temperature of 0° C.

4. The golf ball according to claim 1, wherein the polyurethane includes a linear olefin diol as a polyol component.

5. The golf ball according to claim 1, wherein the polyurethane includes a polyurethane obtained by a reaction between (A) a polyol composition and (B) a polyisocyanate composition, (A) the polyol composition contains a urethane polyol, and the urethane polyol includes a linear olefin diol as a constituent component.

6. The golf ball according to claim 4, wherein the olefin diol is a compound having a linear main chain which includes a backbone formed by ring-opening polymerization of a cycloolefin, and hydroxy groups at both terminals of the main chain.

7. The golf ball according to claim 6, wherein the olefin diol includes a copolymer having a monomer unit obtained by ring-opening polymerization of a monocylic cycloolefin monomer and a monomer unit obtained by ring-opening polymerization of a polycylic cycloolefin monomer.

8. The golf ball according to claim 6, wherein the olefin diol includes a copolymer having a monomer unit obtained by ring-opening polymerization of cyclopentene and a monomer unit obtained by ring-opening polymerization of a compound having a norbornene ring.

9. The golf ball according to claim 1, wherein the polyurethane includes an isocyanurate-modified product of a diisocyanate as a polyisocyanate component.

10. The golf ball according to claim 9, wherein the diisocyanate includes hexamethylene diisocyanate and/or isophorone diisocyanate.

11. The golf ball according to claim 7, wherein in 100 mass % of total monomer units constituting the olefin diol, an amount of the monomer unit obtained by the ring-opening polymerization of the monocylic cycloolefin monomer ranges from 60 mass % to 95 mass %, and an amount of the monomer unit obtained by the ring-opening polymerization of the polycylic cycloolefin monomer ranges from 5 mass % to 40 mass %.

12. The golf ball according to claim 4, wherein the olefin diol has a viscosity ranging from 50 mPa·s to 30000 mPa·s at a temperature of 25° C.

13. The golf ball according to claim 4, wherein the olefin diol has a glass transition temperature (Tg) ranging from −90° C. to 0° C.

14. The golf ball according to claim 4, wherein the olefin diol has a number average molecular weight ranging from 800 to 6000.

15. The golf ball according to claim 5, wherein the urethane polyol further includes a triol as a constituent component, and a ratio of the triol to the olefin diol (triol/olefin diol) ranges from 1.0 to 2.6 in a molar ratio of OH group.

16. The golf ball according to claim 5, wherein an amount of the olefin diol included in the urethane polyol is 55 mass % or more.

17. The golf ball according to claim 1, wherein the polyurethane has 10% modulus ranging from 1 kgf/cm$^2$ to 50 kgf/cm$^2$.

18. The golf ball according to claim 1, wherein the loss elastic modulus (E″) of the polyurethane at the temperature of −50° C. is 0.3×10$^8$ Pa or more.

* * * * *